United States Patent
Joo et al.

(10) Patent No.: US 7,532,169 B2
(45) Date of Patent: May 12, 2009

(54) MOBILE TERMINAL

(75) Inventors: Won Seok Joo, Seoul (KR); Kwang Hyun Ann, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/892,388

(22) Filed: Aug. 22, 2007

(65) Prior Publication Data

US 2008/0051164 A1  Feb. 28, 2008

Related U.S. Application Data

(63) Continuation of application No. 11/649,756, filed on Jan. 5, 2007.

(30) Foreign Application Priority Data

Aug. 22, 2006   (KR) .................... 10-2006-0079336

(51) Int. Cl.
*H01Q 1/24* (2006.01)
(52) U.S. Cl. .................. 343/702; 455/575.1; 455/575.4
(58) Field of Classification Search ................ 343/702; 455/90.3, 575.1, 575.4, 575.5, 575.7; 348/374
See application file for complete search history.

(56) References Cited

U.S. PATENT DOCUMENTS

| 6,893,169 | B1 | 5/2005 | Exposito et al. |
| 7,233,293 | B2* | 6/2007 | Ryu et al. .................... 343/702 |
| 2004/0189853 | A1 | 9/2004 | Takeuchi et al. |
| 2004/0198307 | A1* | 10/2004 | Chang ........................ 455/348 |
| 2005/0049019 | A1* | 3/2005 | Lee .......................... 455/575.4 |
| 2005/0174468 | A1 | 8/2005 | Herranen et al. |
| 2006/0097933 | A1* | 5/2006 | Lee ............................. 343/702 |
| 2006/0125700 | A1* | 6/2006 | Kanazawa ................... 343/702 |
| 2008/0024893 | A1* | 1/2008 | Vanjani et al. ................. 360/1 |

FOREIGN PATENT DOCUMENTS

| DE | 10345230 A1 | 4/2005 |
| EP | 0658030 A1 | 6/1995 |
| EP | 1148716 A1 | 10/2001 |
| EP | 1213924 A1 | 6/2002 |
| EP | 1492332 A2 | 12/2004 |
| EP | 1750417 A | 2/2007 |
| JP | 11191865 A | 7/1999 |
| KR | 10-2006-0005063 A | 1/2006 |
| WO | WO-2004/066692 A | 8/2004 |
| WO | WO-2006/031078 A1 | 3/2006 |

* cited by examiner

*Primary Examiner*—Tho G Phan
(74) *Attorney, Agent, or Firm*—Birch, Stewart, Kolasch & Birch, LLP

(57) ABSTRACT

A mobile terminal having a first body including a front surface, a rear surface, and a pair of side surfaces connecting the front surface to the rear surface, the pair of side surfaces extending in a longitudinal direction of the first body, a display located at the front surface of the first body, and a second body having a front surface, a rear surface, and a pair of side surfaces connecting the front surface to the rear surface, the pair of side surfaces extending in a longitudinal direction of the second body, the second body being moveable with respect to the first body to expose a portion of the front surface of the second body. The pair of side surfaces of the second body are slidable along the pair of side surfaces of the first body and a portion of the pair of side surfaces of the second body overlaps a portion of the pair of side surfaces of the first body.

21 Claims, 14 Drawing Sheets

MOBILE TERMINAL

CROSS REFERENCE TO RELATED APPLICATIONS

This application is a continuation of prior application Ser. No. 11/649,756, filed Jan. 5, 2007, which claims the benefit of Korean Patent Application No. 10-2006-0079336, filed on Aug. 22, 2006, all of which are hereby incorporated by reference as if fully set forth herein.

BACKGROUND OF THE INVENTION

1. Field of the Invention

The present invention relates to a mobile terminal, and more particularly, to a mobile terminal that can enhance user usage convenience with a slimmer terminal.

2. Description of Related Art

In general, a mobile terminal means a cellular phone, a PDA (Personal Digital Assistant), and the like, which a user can carry with himself/herself to send/receive various kinds of information, such as images, voices, and text massages via wireless communication or to receive various services via connection to a predetermined server.

That form of the mobile terminal, especially a cellular phone, has evolved from an initial bar type into a flip type, folder type, and a slide member type according to consumer demand and technical development.

Recently, the decreasing thickness of a mobile terminal has become a key part for the success of mobile terminal technology in satisfying a user's demand, because a user prefers a slimmer and lighter mobile terminal with a large display window to enjoy various multi-media functions as well as to talk on the terminal.

FIGS. 1 and 2 illustrate a conventional slide type mobile terminal. FIGS. 1 and 2 are side sectional views illustrating a state where a conventional mobile terminal slides up and slides down, respectively.

As shown in FIGS. 1 and 2, a conventional slide type mobile terminal includes a body 10 and a LCD (liquid crystal display) part 20. A main PCB (printed circuit board) 12 is embedded longitudinally from an upper end of the mobile terminal to a lower end thereof. The LCD part 20 is provided on a front surface of the body 10 to be capable of sliding on the front surface and has a LCD 22 therein to display various kinds of information.

The body 10 and the LCD part 20 dually split the conventional mobile terminal from the upper end to the lower end. The body 10 further includes an antenna, a keypad 14 and a battery 15. The antenna is an embedded antenna which transmits/receives a signal to/from a base station and the like. The keypad 14 is provided in a lower portion of the body 10 to be exposable by a user's sliding up the LCD part 20 so that he/she may use keys. The battery 15 is mounted to a rear surface of the body 10 to supply power to various sub-assemblies provided within the conventional mobile terminal. The LCD part 20 further includes a PCB 23 that is electrically connected to the LCD 22.

Also, a FPCB (flexible printed circuit board) 24 passes through the body 10 and the LCD part 20 to connect the main PCB 12 to the PCB 23 for the LCD 22. Although not shown in FIGS. 1 and 2, the conventional mobile terminal has a sliding device installed between the body 10 and the LCD part 20 to enable the LCD part 20 to slide upwardly.

However, because the main PCB and the PCB for LCD are vertically provided from the upper end to the lower end of the mobile terminal, it is difficult to reduce the overall thickness of the mobile terminal farther.

As shown in FIGS. 1 and 2, there is useless space created partially within the body 10 and the LCD part 20. Thereby, the conventional mobile terminal has another problem of inappropriate space utility.

Furthermore, the conventional mobile terminal has still another problem in that it is difficult to make it slimmer, because the antenna should be installed in either the body or the LCD part.

Still further, the conventional mobile terminal has still another problem in that the upper part thereof is relatively lighter than the lower part when the LCD part slides up, thereby not affording much protection from impacts to the display.

Finally, the conventional mobile terminal has still another problem that it is limited to make it slimmer, because of the thickness of sliding device additionally installed between the body and the LCD part.

BRIEF SUMMARY OF THE INVENTION

An object of the present invention is to provide a mobile terminal which can enhance a user's usage convenience and satisfaction and which can overcome the limitation of a conventional slim mobile terminal to utilize what would otherwise be useless space and to make a mobile terminal slimmer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a first body having a front surface, a rear surface, and a pair of side surfaces connecting the front surface to the rear surface, the pair of side surfaces extending in a longitudinal direction of the first body, a display located at the front surface of the first body, and a second body having a front surface, a rear surface, and a pair of side surfaces connecting the front surface to the rear surface, the pair of side surfaces extending in a longitudinal direction of the second body, the second body being moveable with respect to the first body to expose a portion of the front surface of the second body. The pair of side surfaces of the second body are slidable along the pair of side surfaces of the first body and a portion of the pair of side surfaces of the second body overlaps a portion of the pair of side surfaces of the first body.

In a further aspect, the mobile terminal may include an input device located at the front surface of the first body. The input device may include a touch pad.

In another aspect, the mobile terminal may include a keypad located at the front surface of the first body.

In yet another aspect, the mobile terminal may include a camera located at the rear surface of the first body.

In still another aspect, the mobile terminal may include an input device located at one of the side surfaces of the second body.

In another aspect, the mobile terminal may include an antenna located in an upper part of the first body.

In still another aspect, the first body may include a recessed portion and the pair of side surfaces of the second body may at least partially overlap the recessed portion when the portion of the front surface of the second body is exposed. In addition, the rear surface of the second body may at least partially overlap the recessed portion when the portion of the front surface of the second body is exposed.

In yet another aspect, the mobile terminal includes a sliding module connecting the first body to the second body. Thee sliding module may include a plate member connected to the first body, the plate member including a pair of longitudinally extending plate edges, a slide member located adjacent the plate member and connected to the second body, the slide member having a pair of rails configured to engage the pair of longitudinally extending plate edges, and an elastic device located between the plate member and the slide member, the elastic device assisting with the sliding of the second body.

In another aspect, a portion of the first body may be inserted into the second body.

In still another aspect, the first body has a first thickness, the second body has a second thickness, and the sum of the first thickness and the second thickness is more than an overall thickness of the mobile terminal at a location where the first body overlaps the second body.

In accordance with the purpose of the invention, a mobile terminal includes a first body having a front surface, a second body slidably connected to the first body, a sliding module connecting the first body to the second body, and a display being visible at the front surface of the first body. The sliding module includes a plate member connected to the first body, the plate member including a pair of longitudinally extending plate edges, and a slide member located adjacent the plate member and connected to the second body, the slide member having a pair of rails configured to engage the pair of longitudinally extending plate edges. The display is at least partially disposed between the pair of rails of the slide member In another aspect, at least a portion of the pair of rails may be higher than a lower surface of the display.

In yet another aspect, the sliding module may include an elastic device located between the plate member and the slide member, the elastic device assisting with the sliding of the second body.

In still another aspect, the first body may include a pair of grooves formed on the rear surface, each of the rails being slidable within the corresponding groove.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
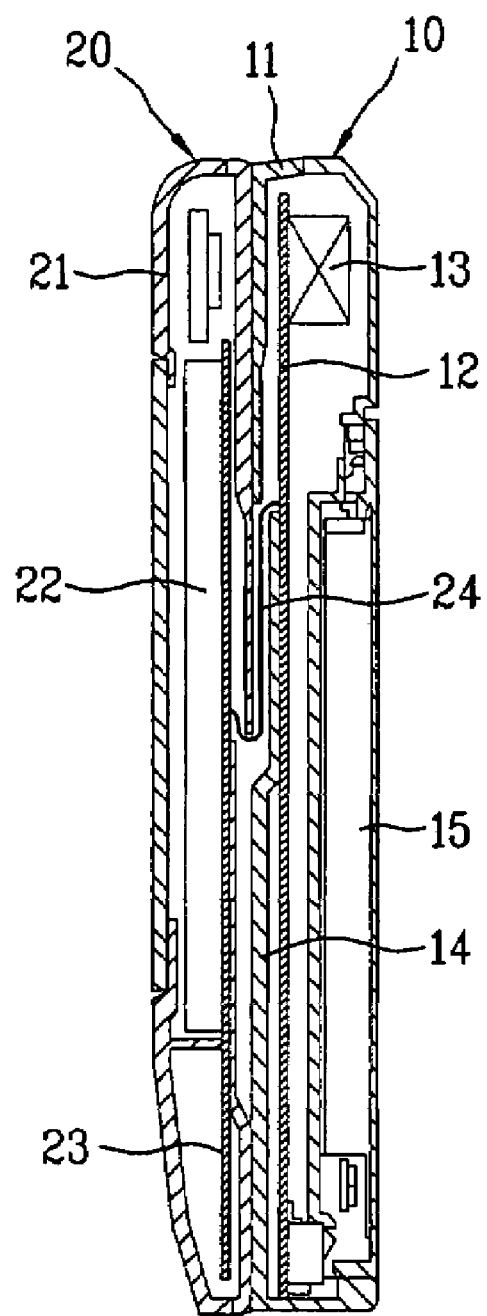
FIGS. 1 and 2 are side sectional views illustrating a state where a conventional mobile terminal slides up and slides down, respectively.
Figure 2:
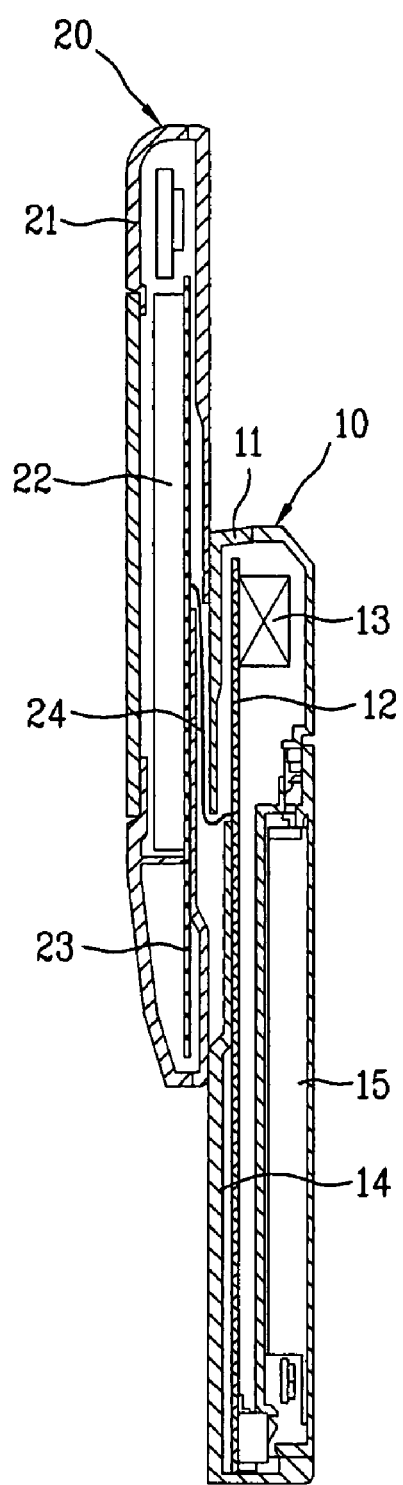
Figure 3:
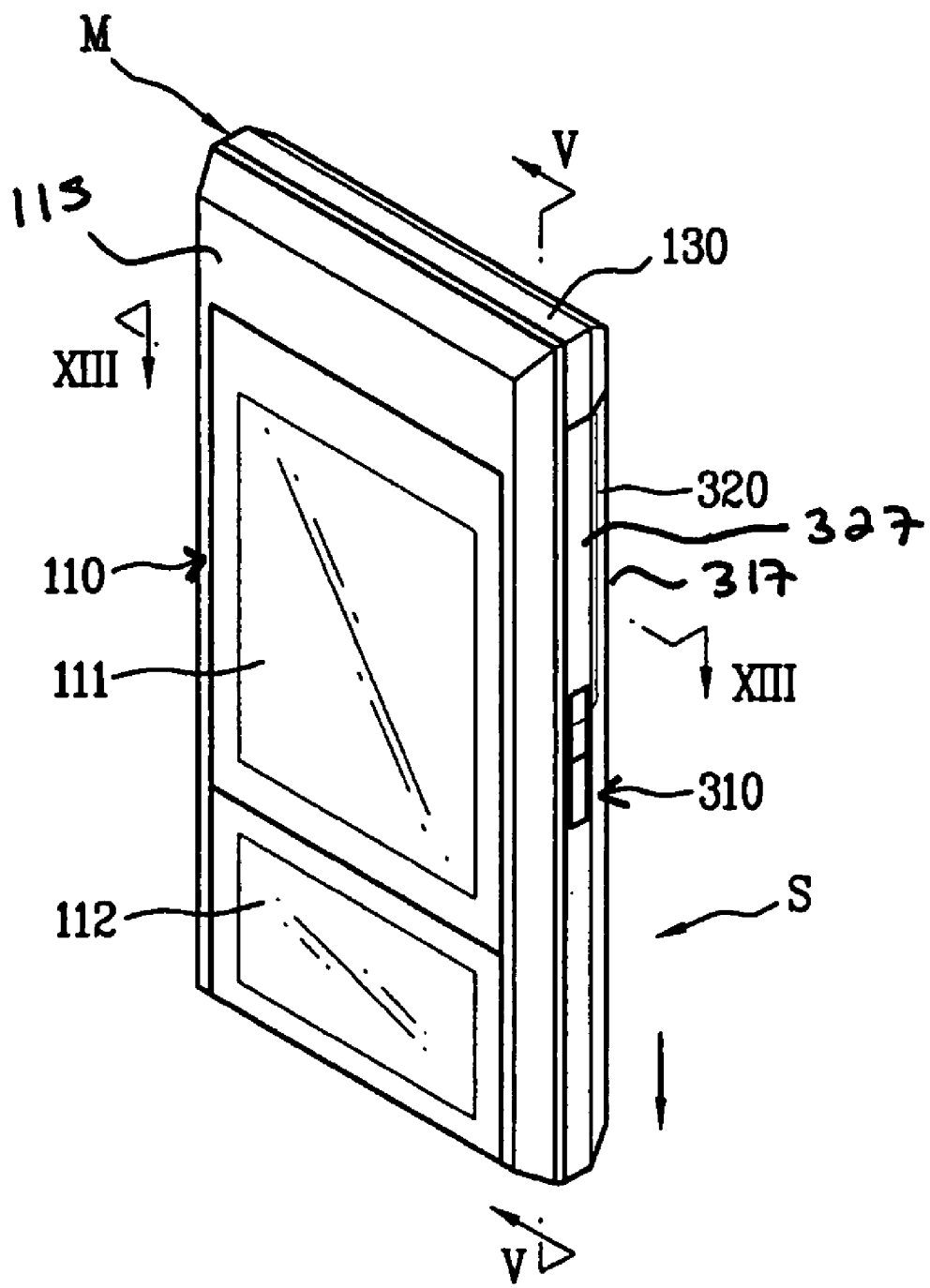
FIGS. 3 and 4 are perspective views illustrating a state where a mobile terminal of the present invention slides up and slides down, respectively.
Figure 4:
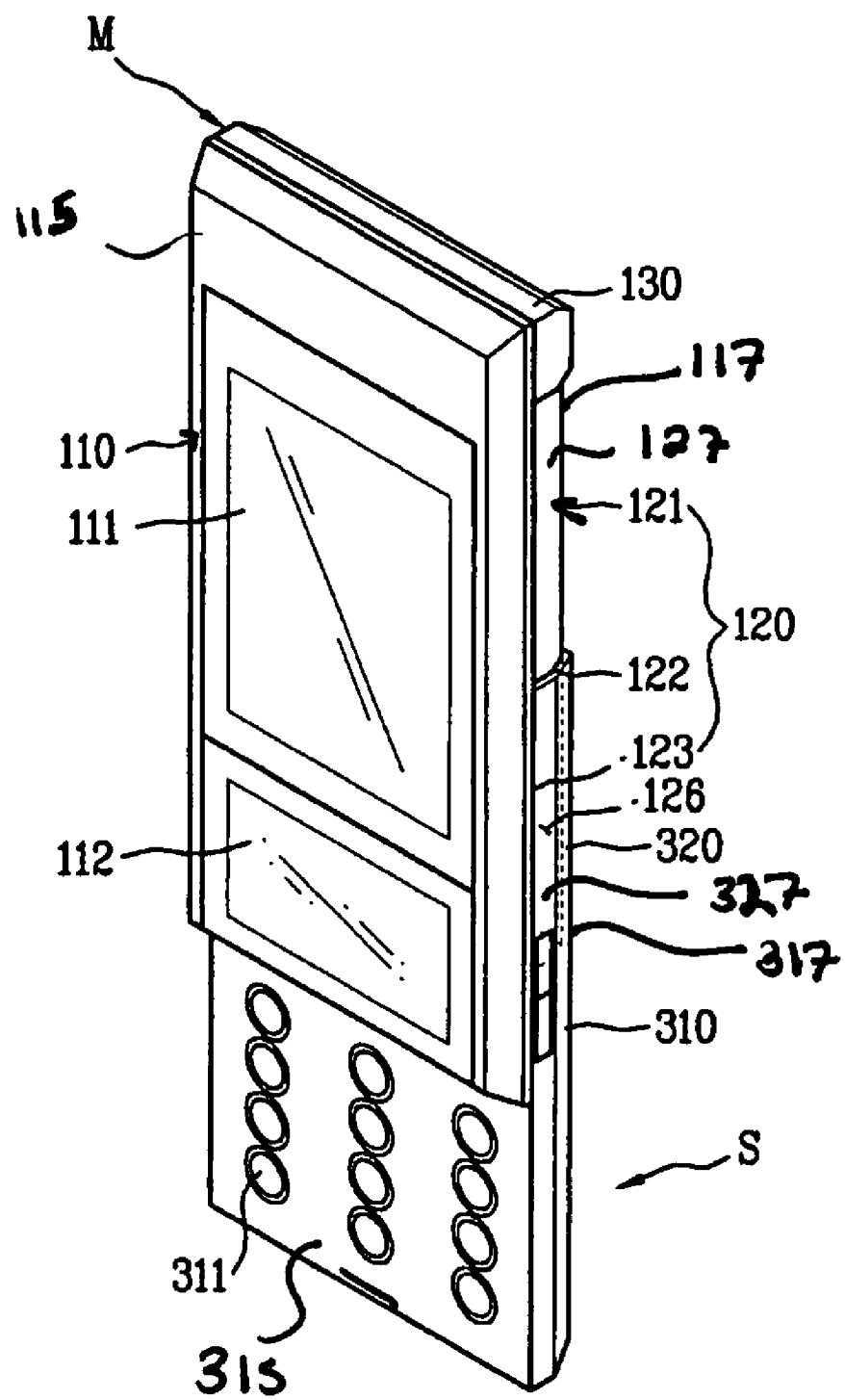

As shown in FIGS. 3 and 4, the mobile terminal of the present invention includes a first body or main unit (M) and a second body or slide unit (S) slidable on a rear part 120 of the main unit (M). The main unit includes a front part 110 in which a display window 111 is provided at a front surface 115 thereof to display predetermined information, an upper end part 130 defining an upper end of the mobile terminal and the rear part 120 having a rear surface 117 that at least partially defines a rear surface of the mobile terminal. The front part 110 may also include an input device 112, such as a touch pad, a navigation key, a jog wheel, or other similar input devices located at the front surface 115. The slide unit (S) includes a slide body 310, a keypad 311 provided in a front surface 315 of the slide body 310 and a battery (not shown) detachable from a rear surface 317 of the slide body 310.

The rear part 120 of the main unit (M) extends a predetermined distance from the upper end part 130 and includes a holding portion 121, a sliding part 123 and a stepped part 122. The holding portion 121 has a predetermined space to hold predetermined sub assemblies therein. The sliding part 123 is stepped toward a front portion from the holding portion 121 so that the slide unit (S) is slidable on the slide part 123 and detailed description of the sliding part 123 will be described in reference with other drawings later. As such, the rear part 120 includes a pair of side surfaces 127 that connect the front surface 115 to the rear surface 127. The stepped part 122 is stepped a predetermined distance to connect the holding portion 121 with the sliding part 123. As shown, the holding portion 121 may be formed as a recessed portion in rear part 120.

A cover portion 320 is formed on the slide unit (S) to cover the holding portion 121 when the slide unit (S) slides up, and to cover a rear space formed by the stepped part 122 and the slide unit (S) on the sliding part 123 when the slide unit (S) slides down. It is understood that the cover portion 320 may include the rear surface 317. As shown, a pair of side surfaces 327 connects the front surface 315 to the rear surface 317. In addition, a portion of the pair of side surfaces 327 of the slide unit (S) overlaps a portion of the pair of side surfaces 127 of the main unit (M).

The main unit (M) and side unit (S) are slidably connected such that the pair of side surfaces 327 of the slide unit (S) are slidable along the pair of side surfaces 127 of the main unit (M) and that at least a portion of the front surface 315 of the slide unit (S) is exposed when the main unit (M) is moved with respect to the slide unit (S). In addition, the pair of side surfaces 327 of the slide unit (S) may at least partially overlap the recessed portion of the holding part 121 when the portion of the front surface 315 of the slide unit (S) is exposed. The rear surface 317 of the slide unit (S) may at least partially overlap the recessed portion of the holding part 121 when the portion of the front surface 317 of the slide unit (S) is exposed.

Figure 13:
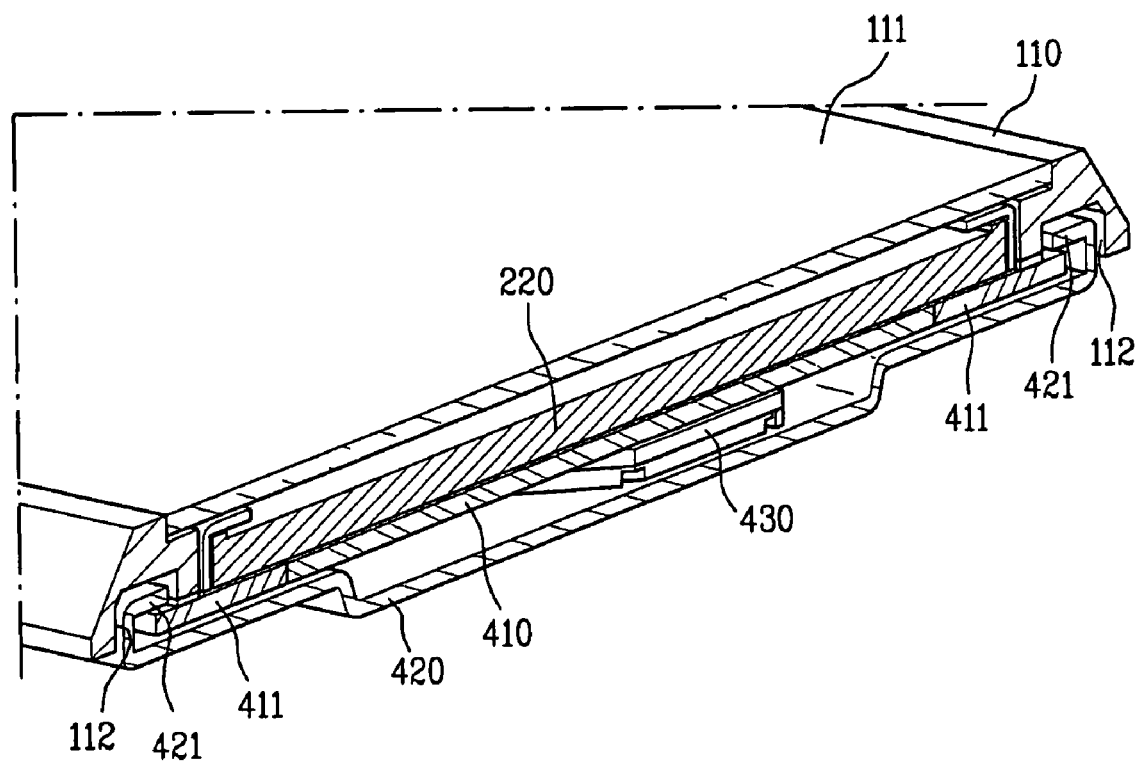
FIG. 13 is a sectional view illustrating a section of the mobile terminal shown taken along section line XIII-XIII in FIG. 3.

FIGS. 5 to 10 are sectional views illustrating a section of the mobile terminal according to various exemplary embodiments and taken along section line V-V shown in FIG. 3. FIG. 13 is a sectional view illustrating section of the mobile terminal taken along section line XIII-XIII shown in FIG. 3.

Figure 5:
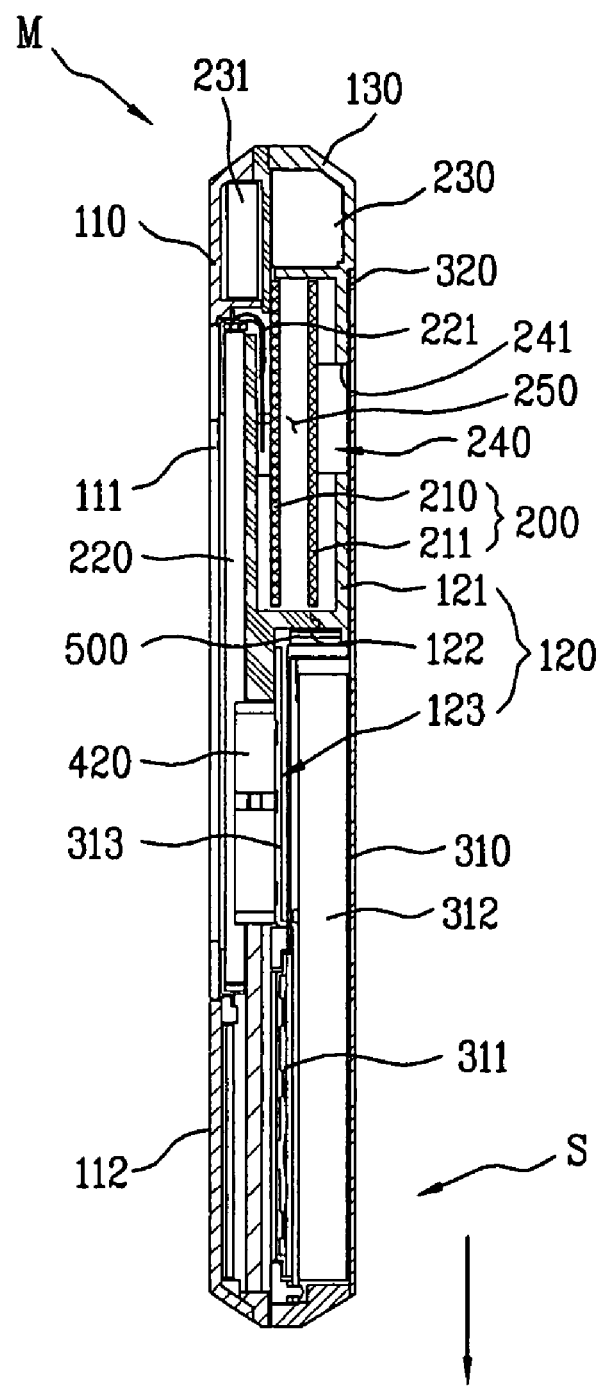
FIGS. 5 and 6 are side sectional view illustrating a state where a mobile terminal according to a first embodiment of the present invention slides up and slides down, respectively.
Figure 6:
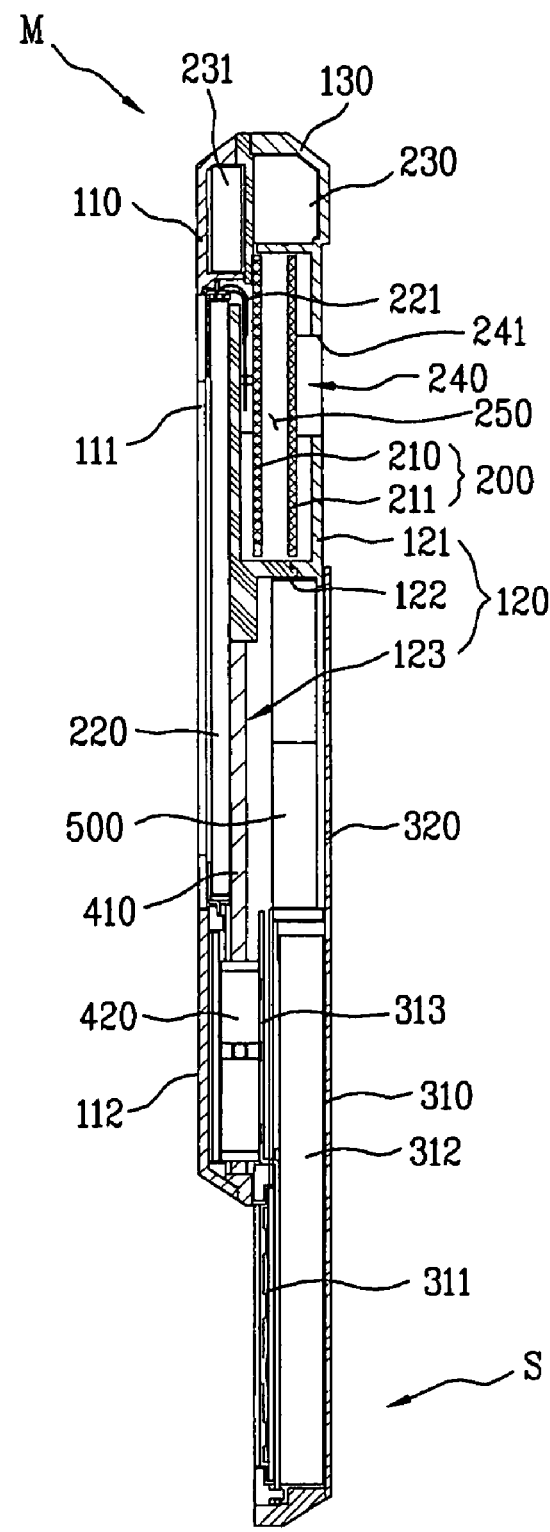

As shown in FIGS. 5 and 6, the main unit (M) includes the front part 110, the rear part 120 and the upper end part 130. A display 220 is installed in the front part 110 and visible through the front surface 115 to display various kinds of information to a user through the display window 111. An antenna 230 is installed in the upper end part 130, which is a held antenna, to send/receive a wireless signal. A speaker 231 is installed in front of the antenna 230. Also, the rear part 120 of the mobile terminal is defined as extend from the upper end part 130 to a lower end of the mobile terminal.

The holding portion 121 is provided on a first portion of a rear of the display 220. The sliding part 123 is provided on a second portion of the rear of the display 220 to be stepped from the holding portion 121 for the slide unit (S) to slide thereon.

It is understood that the first portion of the rear of the display 220 could be an upper portion of the rear of the display 220, and the second portion of the rear of the display 220 could be a lower portion of the rear of the display 220. Hereinafter, the present invention is explained where the first portion of the rear of the display 220 indicates the upper portion of the rear of the display 220, and the second portion of the rear of the display 220 indicates the lower portion of the rear of the display 220.

As shown in FIGS. 5 and 6, the front part 110, the upper end part 130, the holding portion 121, and the stepped part 122 are formed in a case of the main unit (M). The holding portion 121, the stepped part 122 and the sliding part 123 are provided in order from the upper end part 130 to the lower end of the mobile terminal.

The holding portion 121 defines a space 250 provided in the first portion of the rear of the display 220. The stepped part 122 is formed between the holding portion 121 and the sliding part 123 provided in the rear part 120, and the width of the holding portion 121 is thicker than the width of the sliding part 123. As a result, a predetermined internal space, space 250, is formed in the holding portion 121 of the rear part 120 and a predetermined external space is formed outside of the sliding part 123.

A plurality of circuitry supporting substrates 200 are installed in space 250 in the holding portion 121 and the sliding unit (S) slides in the external space formed by the sliding part 123.

The circuitry supporting substrates 200 are installed in the holding portion 121. In a conventional mobile terminal, one main circuitry supporting substrate is longitudinally installed from an upper end to a lower end of the conventional mobile terminal. However, in the mobile terminal of the present invention, a plurality of circuitry supporting substrates 210 and 211, each being formed shorter in the length than the one main circuitry supporting substrate of the conventional mobile terminal, are adjacent to each other enough to be overlapped in space 250. Thereby, the thickness between the front part 110 and the sliding part 123 may be slimmer because the circuitry supporting substrates 200 do not extend therein.

Since the thickness of the portion where the holding portion 121 is provided, that is the thickness of the stepped part 122, is approximately similar to the thickness of the slide unit (S), space efficiency is enhanced overall and the mobile terminal efficiently utilizes what would otherwise be useless space so that the thickness of the mobile terminal can be slimmer. As a result, the functions of the mobile terminal of the present invention can be the same as those of the conventional mobile terminal, but the overall thickness of the mobile terminal of the present invention is slimmer. For example, the individual thickness of the main unit (M) plus the individual thickness of the slide unit (S) is greater than the overall thickness of the mobile device at a location where the main unit (M) overlaps the slide unit (S).

Also, it is preferred that the holding portion 121 and the slide unit (S) are substantially aligned on the rear of the display 220.

In this first exemplary embodiment, the plural circuitry supporting substrates 200 are partial circuitry supporting substrates, which replace a main circuitry supporting substrate used in the conventional mobile terminal. That is, since the main circuitry supporting substrate is installed over substantially the entire length of the conventional mobile terminal, there is a problem that useless space is created. To solve the problem, the main circuitry supporting substrate is adapted as partial circuitry supporting substrates installed in what would otherwise be useless space appropriately. Alternatively, the main circuitry supporting substrates or all of the circuitry supporting substrates installed in the mobile terminal, for example, a circuitry supporting substrate for the display, may be partial circuitry supporting substrates.

Also, since the antenna 230 is provided in the upper end part 130 of the main unit (M) in the front part 110 above the holding portion 121, there is no limitation of antenna installation space like that found in the prior art and the installation space of the antenna 230 is located to overcome the problem that the conventional mobile terminal is thicker due to an auxiliary space for an antenna.

Meanwhile, the display 220 installed between the front part 121 and the sliding part 123 is electrically connected to the circuitry supporting substrates 200 through a connection member 221. Preferably, the connection member 221 is a flexible circuitry supporting substrate. Unlike the conventional element required to connect the main circuitry supporting substrate and the LCD in the conventional mobile terminal, which passes through the LCD part and the body part and needs to be longer to allow for movement of the LCD part with respect to the body part, the connection member 221 of the present invention is installed in spare space formed in an upper portion within the main unit (M) to connect the display 220 to the circuitry supporting substrates 200. Thereby, the inner structure of the mobile terminal may be simpler and the mobile terminal may be slimmer.

The slide unit (S), which is slidable on the sliding part 123, includes a slide body 310, a keypad 311 and a battery 312. The slide body 310 defines an exterior of the slide unit (S) and the keypad 311 is installed on a surface of the slide body 310 for a user to operate a key. The battery 312 is attachable/detachable to/from the other surface of the slide body 310 to supply power to the mobile terminal.

A rear surface of the case defines an exterior of the main unit (M) may form a sliding part 123 so that the slide unit (S) may slidingly move on the rear surface of the case provided in the main unit (M).

If a sliding device for semi-automatic sliding is installed between the rear surface of the case and the slide unit (S), the mobile terminal may be thicker. Thus, when the rear surface of the case provided in the main unit (M) is removed, it is preferred that the sliding device forms the rear surface of the case. That is, the sliding device defines a rear surface of the main unit (M) and the sliding device is a sliding part 123, as shown in FIGS. 5 and 6.

Figure 14:
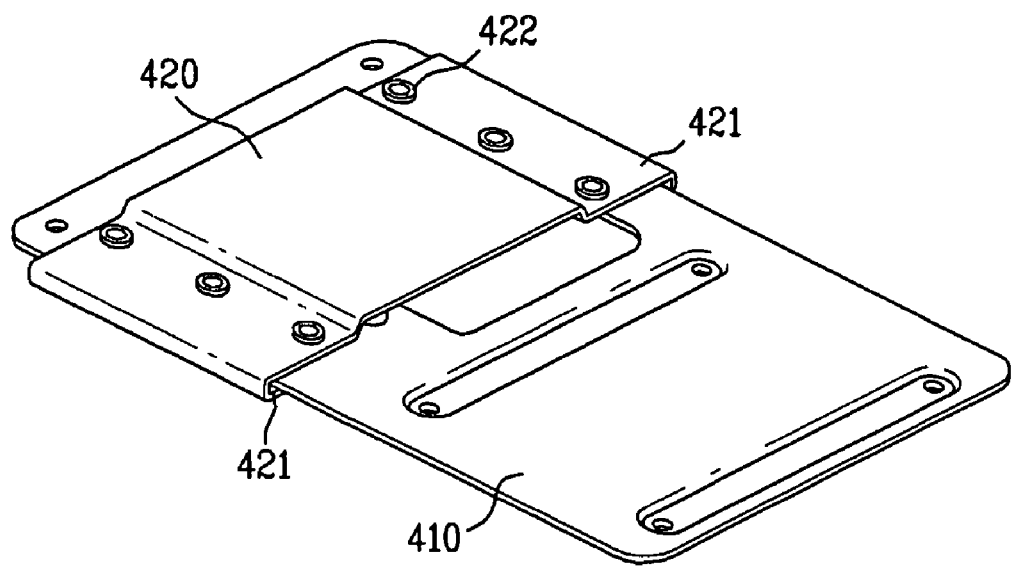
FIG. 14 is a diagram illustrating a sliding device provided in the mobile terminal of the present invention.
Figure 14:
Figure 14:
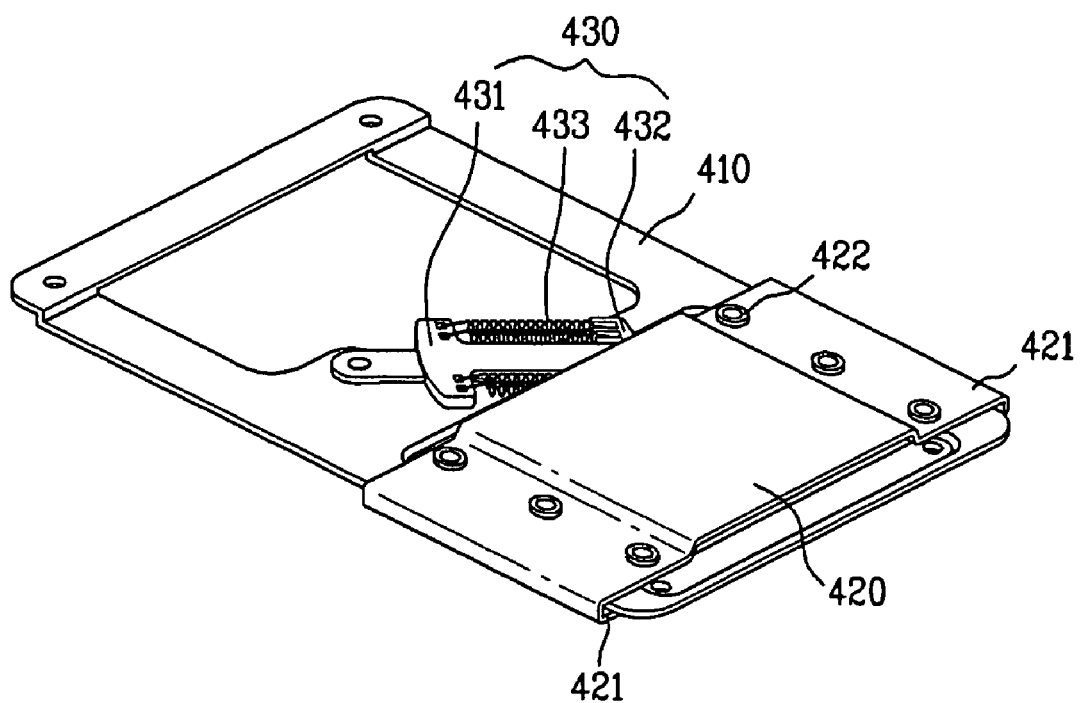

As shown in FIGS. 5 and 6, the sliding part 123 is the sliding device or sliding module, which includes a plate member 410, a slide member 420 and an elastic device 430 (not shown, see FIGS. 13 and 14). The slide member 420 slides on a rear surface of the plate member 410 and the elastic device (not shown) is installed between the slide member 420 and the plate member 410. The detailed description of the sliding device formed as a sliding part 123 will be described with reference to FIG. 13.

As shown in FIG. 13, a display window 111 is provided on a front part 110 and defines a front surface of the mobile terminal according to the present invention. The display 220 is installed in the display window 111 and a plate member 410 is provided on a rear of the display 220.

That is, the plate member 410 is installed on the lower portion of the rear of the display. The plate member 410 includes a pair of longitudinally extending plate edges 411 protruded from the display 220. The width of the plate member 410 including the pair of plate edges 411 is greater than that of the display 220.

The slide member 420 is slidable on the rear surface of the plate member 410. The slide member 420 has a combining part 422 connected to the slide unit (S), and a pair of rails 421 are provided on opposite sides of the slide member 420 and the rails 421 slide on the plate edges 411 of the plate member 410, wherein the side ends of the rails 421 are positioned adjacent to the sides of the display 220 so that the display 220 is at least partially disposed between the pair of rails 421 of the slide member 420. For example, at least a portion of the pair of rails 421 is higher than a lower surface of the display 220.

Each of the rails 421 is bent to cover respective plate edges 411 of the plate member 410 so that the slide member 420 may slide upwardly/downwardly along the plate edges 411 of the plate member 410.

Since the slide member 420 is connected to the slide body 310 of the slide unit (S), the slide unit (S) may slide on the plate member 410 together with the slide member 420. Since the rail 421 is sliding on a side surface of the display 220, not on a rear surface of the display 220, the mobile terminal can be slimmer. That is shown in side sectional views of FIGS. 5 to 10. Seen from a side of the mobile terminal, the slide member 420 slidingly moves on a side surface of the display 220.

In the exemplary embodiment shown, a guiding groove 112 is formed on both sides of the front part 110 so that the rail 421 may slide in the guiding groove 112.

Figure 11:
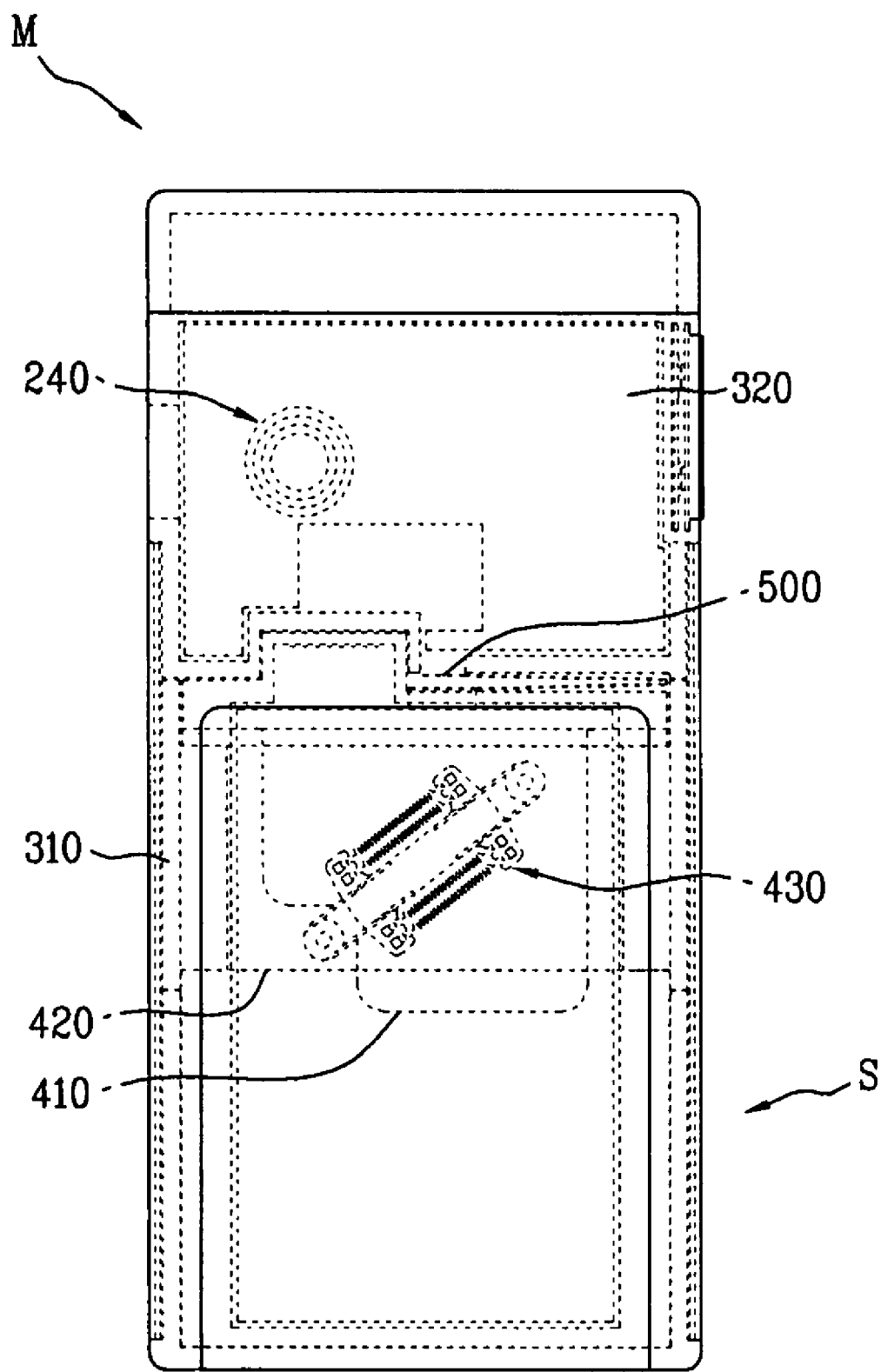
FIGS. 11 and 12 are diagrams illustrating a rear surface of the mobile terminal in the state of FIGS. 5 and 6.
Figure 12:
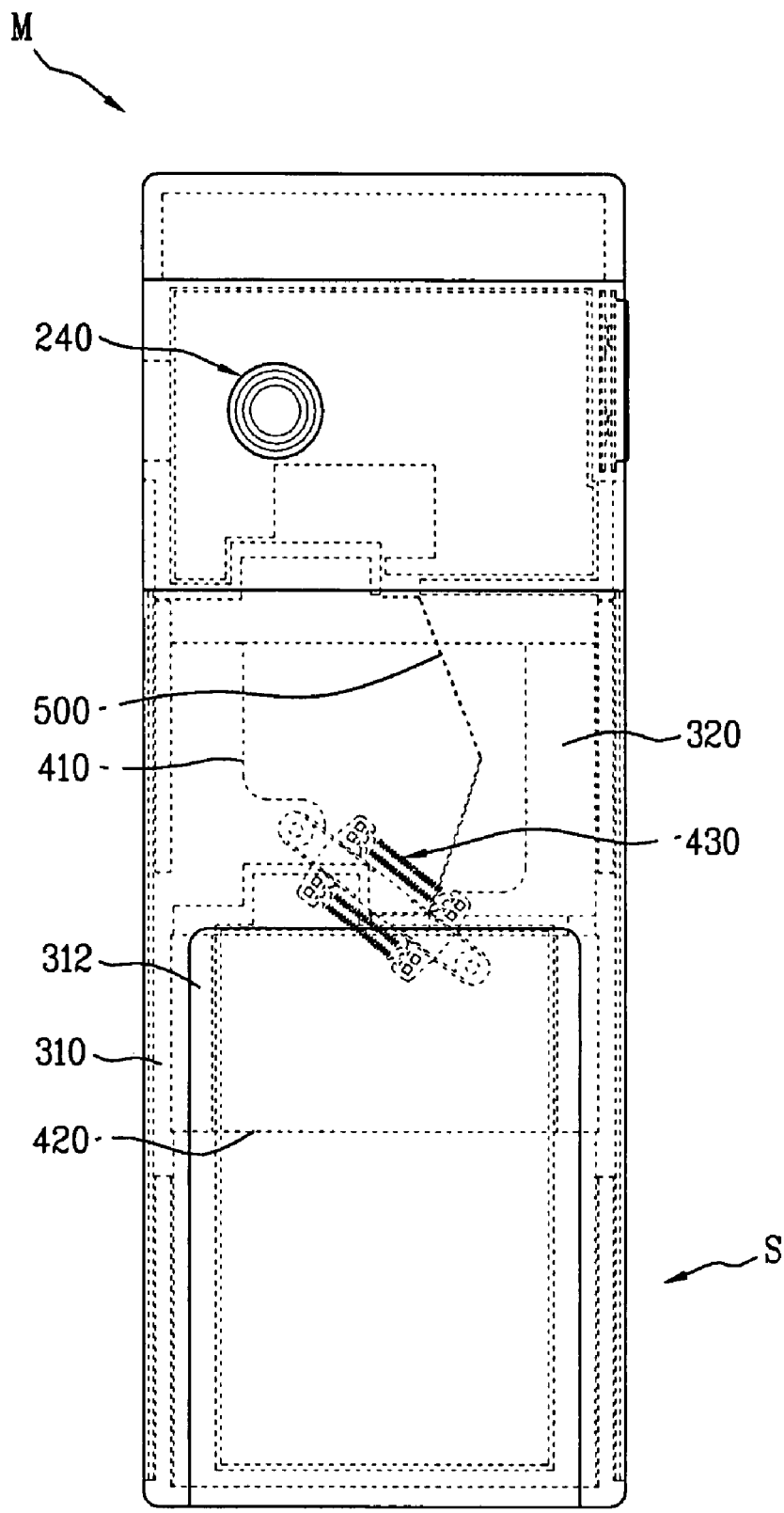

That sliding motion is shown in FIGS. 11 and 12 of a rear surface of the mobile terminal illustrating the sliding motion in detail and FIG. 14 illustrates the sliding device installed on a rear surface of the display part 220 in detail, which will be described later.

With reference to the rear surface structure of the mobile terminal shown in FIGS. 11 and 12, a first embodiment of the present invention illustrated in FIGS. 5 and 6 will be described. A flexible circuitry supporting substrate 500 is arranged between the stepped part 122 and an upper end of the slide body 310 to connect at least one of the plurality of circuitry supporting substrates 210 and 211 to the slide unit (S). The flexible circuitry supporting substrate 500 transmits/processes an electric signal among the keypad 311 and the battery 312 of the slide unit (S), and the circuitry supporting substrates 200, and is repeatedly folded/unfolded by the sliding motion of the slide unit (S). That is, when the slide unit (S) slides down (see FIGS. 5 and 6), the flexible circuitry supporting substrate 500 is unfolded. When the slide unit (S) slides up, the stepped part 122 is spaced apart from the slide body 310 a predetermined distance to provide the least amount of space to hold the flexible circuitry supporting substrate 500.

As shown in FIGS. 5 to 10, the flexible circuitry supporting substrate 500 is installed in a rear space formed by the stepped part 122, the sliding part 123, and the slide body 310. Preferably, a cover member is provided to cover the rear space so that the flexible circuitry supporting substrate 500 is prevented from being exposed outside.

The cover member may be varied in various embodiments. FIGS. 5 and 6 illustrate a first embodiment of the cover member. The cover member is embodied as a cover portion 320 extending from the slide body 310 of the slide unit (S) toward the upper end part 130. The cover portion 320 may be fastened to the slide body 310 of the slide unit (S) or be formed as one body with the slide body 310. When the slide unit (S) slides up (see FIGS. 5 and 6), the cover portion 320 covers the holding portion 121 of the main unit (M). When the slide unit (S) slides down (see FIGS. 6 and 12), the cover portion 320 covers the rear space formed by the stepped part 122, the sliding part 123, and the slide body 310.

As shown in FIGS. 5 and 6, a camera 240 of the mobile terminal according to the first embodiment of the present invention is provided in the holding portion 121 to be exposed outside. A seating hole 241 is formed on a portion of the holding portion 121 where the camera 240 is provided to prevent the camera 240 from being projected outside. The camera 240 is projected toward the inside of the holding portion 121. When the camera 240 has high pixels, the camera 240 is thicker. As a result, a hole (not shown) may be formed on at least one circuitry supporting substrate 211 adjacent to the holding portion 121 to insert the projected portion of the camera 240 therein. When the camera 240 is not so thick, the camera 240 may be installed without the hole.

Since the camera 240 is not projected outside, the cover portion 320 may slidingly move without any interference when the slide unit (S) slidingly moves. When the slide unit (S) slides up, the cover portion 320 covers the camera 240, and the camera 240 cannot be used (see FIGS. 5 and 11). When the slide unit (S) slides down, the camera 240 is exposed and it can be used (see FIGS. 6 and 12). The camera 240 may take a picture, a moving picture, a picture for special effects and all other possible pictures.

Figure 7:
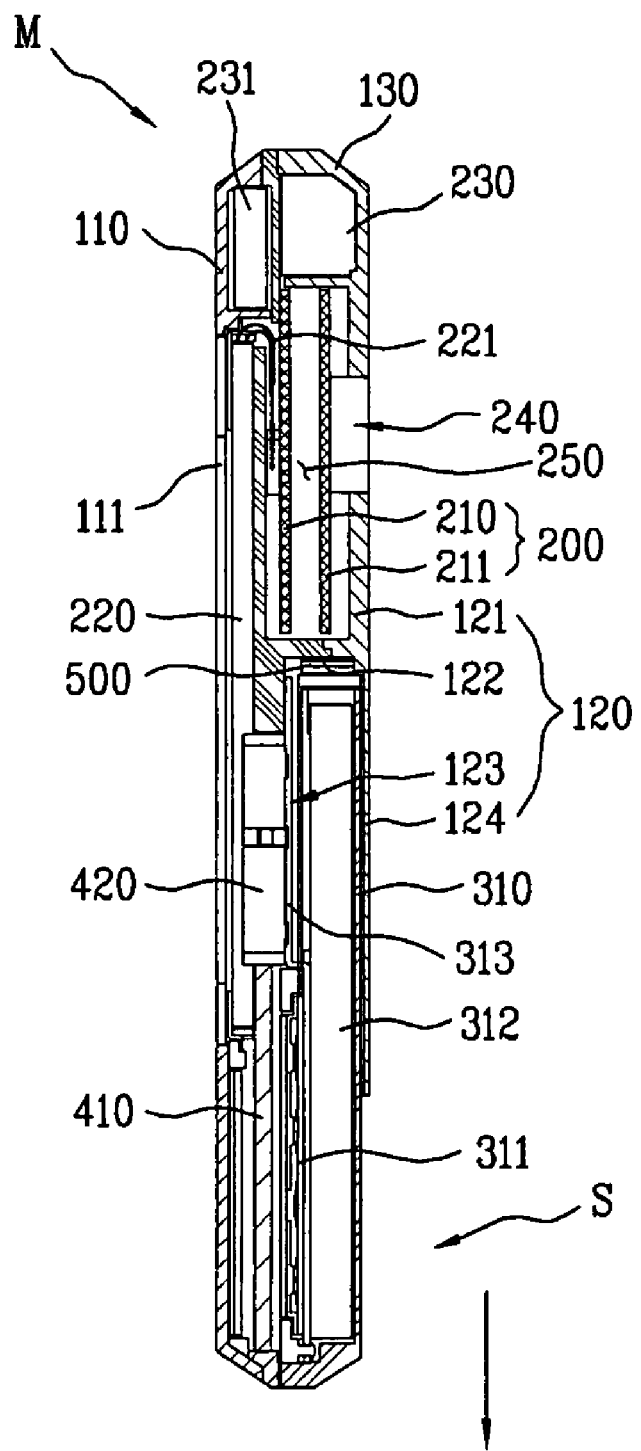
FIGS. 7 and 8 are side sectional view illustrating a state where a mobile terminal according to a second embodiment of the present invention slides up and slides down, respectively.
Figure 8:
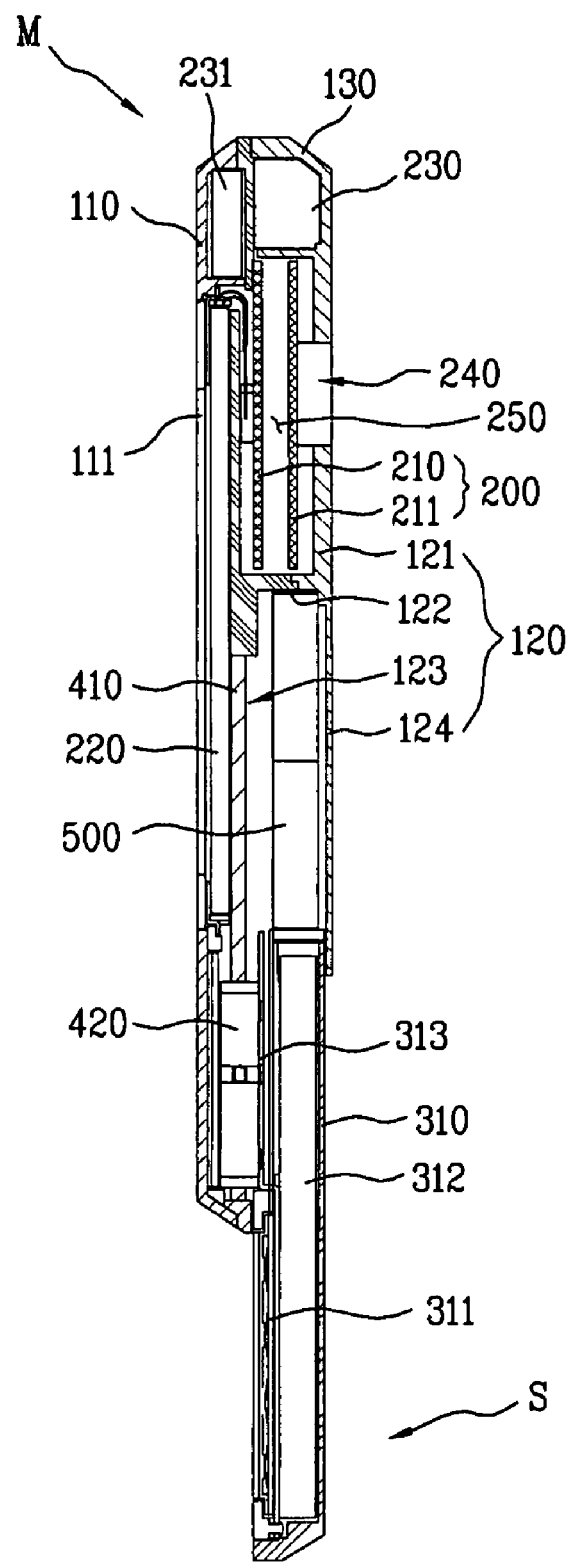

FIGS. 7 and 8 illustrate a second exemplary embodiment of the cover member of the mobile terminal according to the present invention. A cover portion 124 extends downwardly a predetermined distance from the holding portion 121.

That is, in the second exemplary embodiment, the rear part 120 of the main unit (M) further includes a cover portion 124 extended from the holding portion 121.

Preferably, when the slide unit (S) slides down, an upper end of the slide body 310 does not escape from a lower end of the cover portion 124. The sliding device may control that or an auxiliary stopper may be provided.

The other configurations of the second embodiment drawn in FIG. 7 and 8 are the same as those of the first embodiment. More specifically, the configuration of the main unit including the front part 110, the upper end part 130, the display 220, the antenna 230, the camera 240, the circuitry supporting substrates 200, and the configuration of the slide unit (S) are the same as those of the first embodiment except the cover portion 320 suggested in the first embodiment. The configuration of the sliding part 123 including the plate member 410, the slide member 420, and the elastic device 430 is also the same as that of the first embodiment, except that the camera 240 is not covered by the cover portion 124 and is always exposed.

Figure 9:
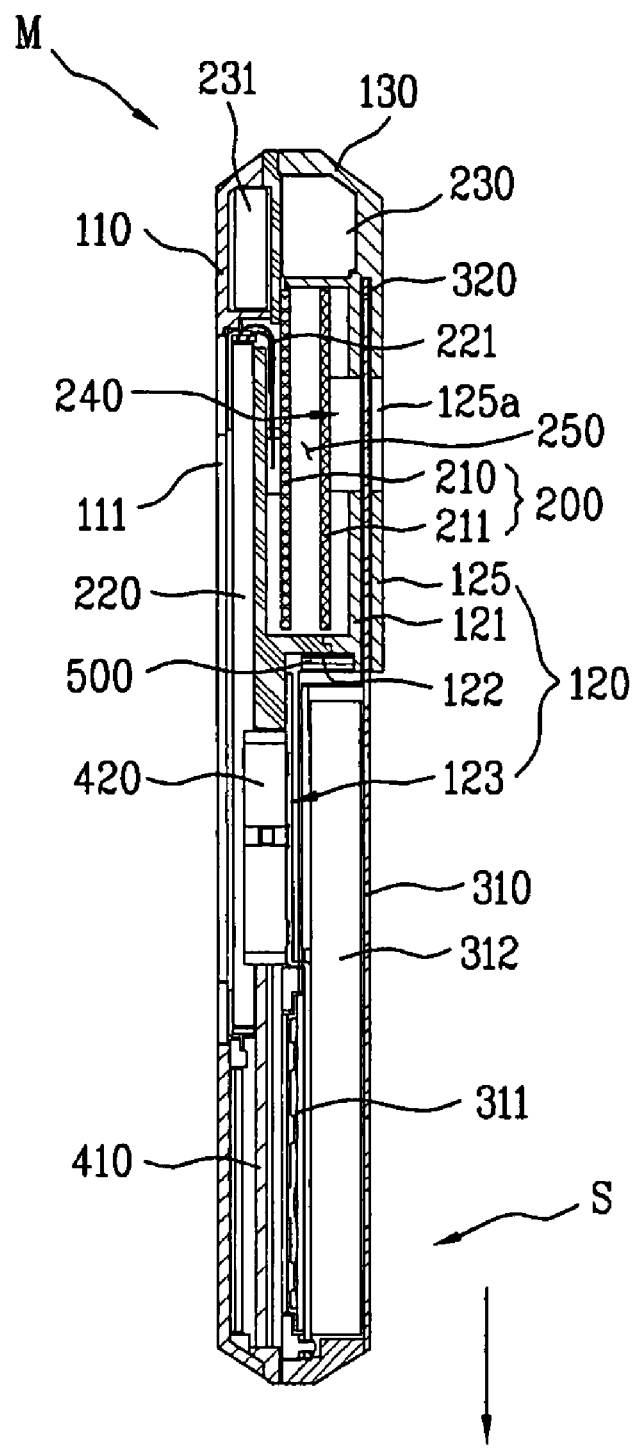
FIGS. 9 and 10 are side sectional view illustrating a state where a mobile terminal according to a third embodiment of the present invention slides up and slides down, respectively.
Figure 10:
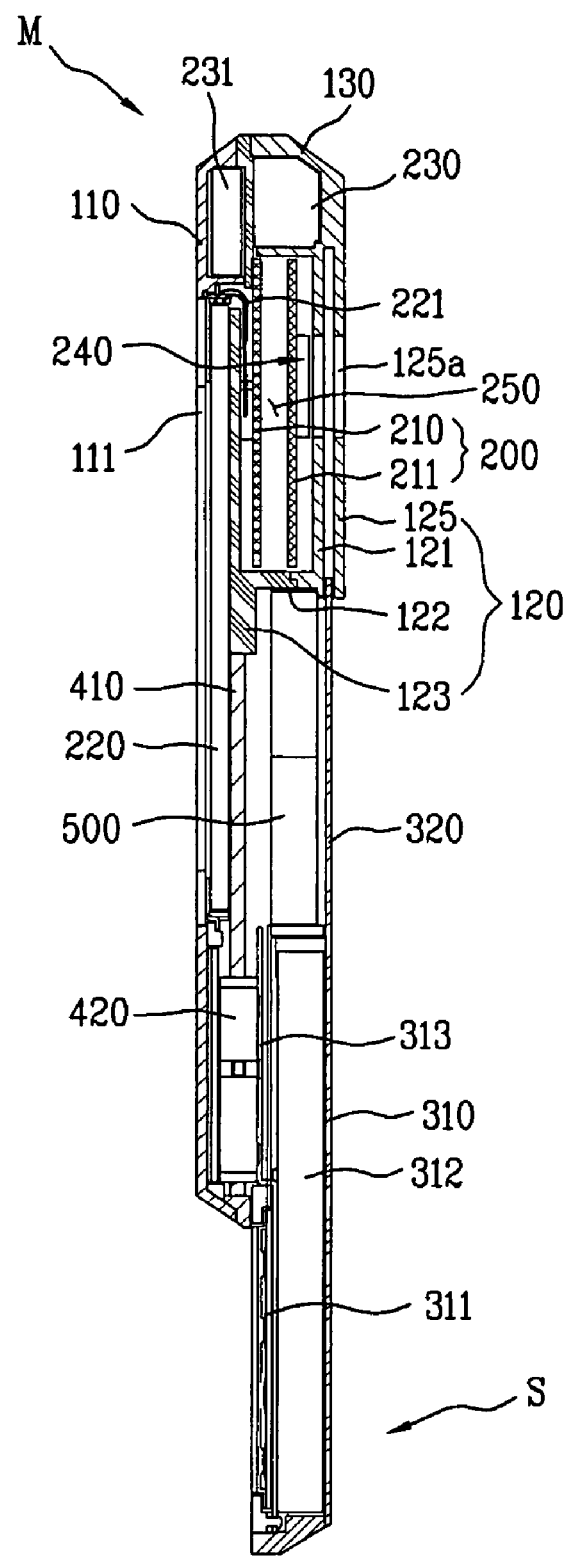

In a third exemplary embodiment illustrated in FIGS. 9 and 10, the slide unit (S) also includes a slide body 310, a keypad 311, a battery 312 and a cover portion 320 like the first embodiment. The main unit (M) also includes a front part 110, an upper end part 130, a display 220, an antenna 230, a camera 240, and circuitry supporting substrates 200 like the first embodiment. The only difference is in the configuration of the part 120 of the main unit (M). A hole 125a is formed on an insert part 125 of the camera 240 to expose the camera 240.

That is, the rear part 120 of the mobile terminal according to the third embodiment includes a holding portion 121, a stepped part 122, and a sliding part 123. The insert part 125 extends from an upper end of the holding portion 121 to allow for insertion of the cover portion 320 of the slide unit (S) therein.

As shown FIG. 9, when the slide unit (S) slides up, the slide unit (S) slidingly moves upwardly to more fully insert the cover portion 320 in the insert part 125. As shown in FIG. 10, when the slide unit (S) slides down, the slide unit (S) slidingly moves downwardly to partially remove the cover portion 320 from the insert part 125.

In that case, when the slide unit (S) slides down as shown in FIG. 10, it is preferred that the upper end of the cover portion 320 is controlled so as not to be completely pulled out of a lower end of the insert part 125 by a sliding device or an auxiliary stopper.

As shown in FIG. 14, the sliding device of the exemplary embodiments will be described in further detail. A slide member 420 is installed on a rear surface of the plate member 410 to slidingly move. A rail 421 is bent at both opposite side ends of the slide member 420 to cover the opposite side ends of the plate member 410 so that the slide member is slidable on the plate member 410. A combining hole 422 is provided on a rear surface of the slide member 420 to be combined with a connecting part 313 (see FIGS. 5 to 10) of the slide unit (S).

An elastic device 430 is installed between the plate member 410 and the slide member 420. The elastic device includes a first member 431 rotatably fixed to a side of the plate member 410 and a second member 432 rotatably fixed to the slide member 420 so that the first member 431 and the second member 432 are alternated such that a predetermined portion of the first and second member 431 and 432 may be overlapped. Also, an elastic member 433 connects the first member 431 and the second member 432 of the elastic device 430 and has a predetermined tension.

Thus, when the slide member 420 is moved a predetermined distance by a predetermined external force such that the slide member 420 slides either upward or downward, the first member 431 and the second member 432 of the elastic device 430 are overlapped more and the elastic member 433 receives maximum tension to maximize elastic restitution. Once the elastic member 433 reaches maximum tension, any further motion upward or downward is assisted by the elastic member 433 as it returns to the pre-tensed state.

With reference to FIGS. 11 and 12, the sliding motion of the mobile terminal according to the present invention will be described. The FIGS. 11 and 12 illustrate the above semi-automatic sliding motion. When a user applies a predetermined external force to slide the slide unit (S) downwardly from a closed state shown in FIG. 11, the elastic device 430 assists due to the elastic restitution to move the slide unit (S) to an open state shown in FIG. 12.

The mobile terminal having the above configuration has an advantageous effect that the mobile terminal may be slimmer, because the limitation of the prior art is overcome and it utilize what would otherwise be useless space. Also, when the slide unit (S) slides down, the upper portion of the mobile terminal may have relatively heavier weight to give a user confidence in the strength of the main unit (M). Thereby, the mobile terminal of the present invention has another advantageous effect that usage satisfaction of the mobile terminal may be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A mobile terminal comprising:
    a first body having a front surface, a rear surface, and a pair of side surfaces connecting the front surface to the rear surface, the pair of side surfaces extending in a longitudinal direction of the first body and being spaced apart in a width direction;
    a display located at the front surface of the first body; and
    a second body having a front surface, a rear surface, and a pair of side surfaces connecting the front surface to the rear surface, the pair of side surfaces extending in a longitudinal direction of the second body, the second body being moveable with respect to the first body to expose a portion of the front surface of the second body,
    wherein the pair of side surfaces of the second body are slidable along the pair of side surfaces of the first body, and
    wherein a portion of the pair of side surfaces of the second body is located outwardly of a portion of the pair of side surfaces of the first body in the width direction so that the portion of the pair of side surfaces of the second body overlaps the portion of the pair of side surfaces of the first body in the width direction.

2. The mobile terminal of claim 1, further comprising an input device located at the front surface of the first body.

3. The mobile terminal of claim 2, wherein the input device includes a touch pad.

4. The mobile terminal of claim 2, further comprising a keypad located at the front surface of the second body.

5. The mobile terminal of claim 4, further comprising a camera located at the rear surface of the first body.

6. The mobile terminal of claim 5, further comprising an input device located at one of the side surfaces of the second body.

7. The mobile terminal of claim 1, further comprising an antenna located in an upper part of the first body.

8. The mobile terminal according to claim 1, wherein the pair of side surfaces of the first body includes a recessed portion and the pair of side surfaces of the second body at least partially overlaps the recessed portion when the portion of the front surface of the second body is exposed.

9. The mobile terminal according to claim 8, wherein the rear surface of the second body at least partially overlaps the recessed portion when the portion of the front surface of the second body is exposed.

10. The mobile terminal according to claim 1, further comprising a sliding module connecting the first body to the second body, the sliding module including:
- a plate member connected to the first body, the plate member including a pair of longitudinally extending plate edges;
- a slide member located adjacent the plate member and connected to the second body, the slide member having a pair of rails configured to engage the pair of longitudinally extending plate edges; and
- an elastic device located between the plate member and the slide member, the elastic device assisting with the sliding of the second body.

11. The mobile terminal according to claim 1, wherein a portion of the first body is inserted into the second body.

12. The mobile terminal according to claim 1, wherein the first body has a first thickness, the second body has a second thickness, and the sum of the first thickness and the second thickness is more than an overall thickness of the mobile terminal at a location where the first body overlaps the second body.

13. A mobile terminal comprising:
- a first body having a front surface;
- a second body slidably connected to the first body;
- a sliding module connecting the first body to the second body, the sliding module including:
- a plate member connected to the first body, the plate member including a pair of longitudinally extending plate edges; and
- a slide member located adjacent the plate member and connected to the second body, the slide member having a pair of rails configured to engage the pair of longitudinally extending plate edges; and
- a display at least partially disposed between the pair of rails of the slide member, the display being visible at the front surface of the first body.

14. The mobile terminal according to claim 13, wherein at least a portion of the pair of rails is higher than a lower surface of the display.

15. The mobile terminal according to claim 13, wherein the sliding module includes an elastic device located between the plate member and the slide member, the elastic device assisting with the sliding of the second body.

16. The mobile terminal according to claim 13, wherein the first body includes a pair of grooves formed on the rear surface, each of the rails being slidable within the corresponding groove.

17. A mobile terminal comprising:
- a first body having a front surface, a rear surface, and a pair of side surfaces connecting the front surface to the rear surface, the pair of side surfaces extending in a longitudinal direction of the first body and being spaced apart in a width direction;
- a display located at the front surface of the first body;
- an input device located at the front surface of the first body;
- a second body having a front surface, a rear surface, and a pair of side surfaces connecting the front surface to the rear surface, the pair of side surfaces extending in a longitudinal direction of the second body, the second body being moveable with respect to the first body to expose a portion of the front surface of the second body, the pair of side surfaces of the second body being slidable along the pair of side surfaces of the first body, and a portion of the pair of side surfaces of the second body being located outwardly of a portion of the pair of side surfaces of the first body in the width direction so that the portion of the pair of side surfaces of the second body overlaps the portion of the pair of side surfaces of the first body in the width direction;
- a keypad located at the front surface of the second body; and
- an input device located at one of the side surfaces of the second body.

18. The mobile terminal of claim 17, wherein at least one of the input device includes a touch pad.

19. The mobile terminal of claim 17, further comprising a camera located at the rear surface of the first body.

20. The mobile terminal of claim 17, further comprising an antenna located in an upper part of the first body.

21. The mobile terminal according to claim 17, wherein a portion of the first body is inserted into the second body.

* * * * *